US008997196B2

(12) United States Patent
Kariv et al.

(10) Patent No.: US 8,997,196 B2
(45) Date of Patent: Mar. 31, 2015

(54) FLEXIBLE END-POINT COMPLIANCE AND STRONG AUTHENTICATION FOR DISTRIBUTED HYBRID ENTERPRISES

(75) Inventors: Asaf Kariv, Ra'anana (IL); Oleg Ananiev, Migdal Haemeq (IL); Eli Tovbeyn, Modiin (IL); Daniel Kershaw, Mercer Island, WA (US); Eugene (John) Neystadt, Kfar-Saba (IL)

(73) Assignee: Microsoft Corporation, Redmond, WA (US)

( * ) Notice: Subject to any disclaimer, the term of this patent is extended or adjusted under 35 U.S.C. 154(b) by 693 days.

(21) Appl. No.: 12/815,215

(22) Filed: Jun. 14, 2010

(65) Prior Publication Data

US 2011/0307947 A1  Dec. 15, 2011

(51) Int. Cl.
*G06F 7/04* (2006.01)
*H04L 29/06* (2006.01)

(52) U.S. Cl.
CPC .......... *H04L 63/08* (2013.01); *H04L 2463/082* (2013.01); *H04L 63/102* (2013.01)
USPC .............. 726/9; 726/1; 726/4; 726/5; 726/12; 726/25; 713/156; 713/185

(58) Field of Classification Search
CPC ..... G06F 21/34; G06F 21/31; H04L 63/0853; G07F 7/1008; G06Q 20/341
USPC ........................................................ 726/12, 9
See application file for complete search history.

(56) References Cited

U.S. PATENT DOCUMENTS

| | | | |
|---|---|---|---|
| 6,243,816 B1 * | 6/2001 | Fang et al. | 726/5 |
| 6,275,944 B1 * | 8/2001 | Kao et al. | 726/36 |
| 6,362,836 B1 * | 3/2002 | Shaw et al. | 715/744 |
| 6,624,760 B1 | 9/2003 | Kinzel | |
| 2003/0191817 A1 * | 10/2003 | Fidler | 709/219 |
| 2004/0228541 A1 * | 11/2004 | Ikenoue | 382/254 |

(Continued)

FOREIGN PATENT DOCUMENTS

| | | | |
|---|---|---|---|
| EP | 1802155 A1 | 6/2007 | |
| WO | WO 0154044 A1 | 7/2001 | |
| WO | WO 2007145540 A2 | 12/2007 | |

OTHER PUBLICATIONS

Npl search results from google.*

(Continued)

*Primary Examiner* — Yonas Bayou
(74) *Attorney, Agent, or Firm* — Henry Gabryjelski; Kate Drakos; Micky Minhas

(57) ABSTRACT

Systems, methods and apparatus for accessing at least one resource hosted by at least one server of a cloud service provider. In some embodiments, a client computer sends authentication information associated with a user of the client computer and a statement of health regarding the client computer to an access control gateway deployed in an enterprise's managed network. The access control gateway authenticates the user and determines whether the user is authorized to access the at least one resource hosted in the cloud. If the user authentication and authorization succeeds, the access control gateway requests a security token from a security token service trusted by an access control component in the cloud and forwards the security token to the client computer. The client computer sends the security token to the access component in the cloud to access the at least one resource from the at least one server.

16 Claims, 5 Drawing Sheets

(56) References Cited

U.S. PATENT DOCUMENTS

| | | | |
|---|---|---|---|
| 2005/0125677 A1* | 6/2005 | Michaelides | 713/185 |
| 2005/0216421 A1* | 9/2005 | Barry et al. | 705/64 |
| 2005/0268107 A1 | 12/2005 | Harris | |
| 2006/0085850 A1 | 4/2006 | Mayfield | |
| 2007/0101409 A1* | 5/2007 | Palekar et al. | 726/4 |
| 2007/0107050 A1 | 5/2007 | Selvarajan | |
| 2007/0136573 A1 | 6/2007 | Steinberg | |
| 2007/0143629 A1 | 6/2007 | Hardjono | |
| 2007/0174630 A1 | 7/2007 | Boudville et al. | |
| 2007/0186099 A1 | 8/2007 | Beck | |
| 2007/0234040 A1* | 10/2007 | Hurst et al. | 713/156 |
| 2008/0163340 A1 | 7/2008 | Cheeniyii | |
| 2008/0201780 A1* | 8/2008 | Khan et al. | 726/25 |
| 2008/0208957 A1 | 8/2008 | Ding | |
| 2008/0244724 A1* | 10/2008 | Choe et al. | 726/12 |
| 2009/0094164 A1* | 4/2009 | Fontaine et al. | 705/67 |
| 2009/0178109 A1 | 7/2009 | Nice | |
| 2010/0115578 A1* | 5/2010 | Nice et al. | 726/1 |

OTHER PUBLICATIONS

A Two-Factor Mobile Authentication Scheme for Secure Financial Transactions: published date Jul. 11-13, 2005, http://ieeexplore.ieee.org/iel5/9999/32116/01493584.pdf?tp=&isnumber=32116&arnumber=1493584&htry=3.

Phone-Based Two-Factor Authentication Now Available for OpenID: 2008, retrieved date Apr. 15, 2010, http://www.reuters.com/article/pressRelease/idUS151722+12May-2008+BW20080512.

Windows Vista Security Series: Building Plug-ins for Network Access Protection, http://msdn.microsoft.com/en-us/library/bb945062.aspx, Oct. 2007, printed on Dec. 18, 2008.

Windows Server 2008—NAP (Network Access Protection), 2008, http://computerperformance.co.uk/Longhorn/server_2008_nap.htm, printed on Oct. 6, 2008.

NAP and FCS, http://blogs.technet.com/clientsecurity/archive/2008/06/18/nap-and-fcs.aspx, printed on Dec. 18, 2008.

NAP Server-Side Architecture http://msdn.microsoft.com/en-us/library/cc895519(VS.85).aspx, printed on Dec. 18, 2008.

* cited by examiner

FLEXIBLE END-POINT COMPLIANCE AND STRONG AUTHENTICATION FOR DISTRIBUTED HYBRID ENTERPRISES

BACKGROUND

Cloud computing is an increasingly popular paradigm in which computing resources, such as software, hardware, and data storage, are provided as services to remote computers via one or more networks. These resources can be shared among multiple entities and can be accessed on demand by each entity. In a typical commercial arrangement, the physical infrastructure (e.g., servers, storage systems, communication infrastructure, etc.) supporting the resources is owned and/or operated by a cloud computing provider, which delivers the resources as services to a customer over the Internet according to some agreed upon level of service and method of billing. This paradigm is attractive to many enterprises because it provides ready access to computation and storage capacities with low upfront capital expenditure. Even for larger enterprises with flexible capital budgets, cloud computing can be a cost effective option for meeting demand spikes.

As an enterprise migrates more of its data and/or applications "to a cloud" (e.g., to be hosted on a cloud computing provider's servers reachable via the Internet), new security challenges arise. For instance, the enterprise may wish to limit access to the resources hosted on cloud servers to authorized users only, preferably according to the same access control policies implemented within the enterprise's own managed network.

FIG. 1 shows a conventional solution for controlling access to resources hosted in a cloud. In this example, multiple applications (e.g., 110A, 110B, . . . ) and data stores (e.g., 115A, 115B, . . . ) are hosted on one or more servers at a cloud facility 105. One or more of these applications and data stores may be hosted on behalf of an enterprise that is a customer of the cloud facility 105. The enterprise also operates its own internal network 155 having one or more servers (e.g., 180A, 180B, . . . ) providing services that may be the same as, or different from, the services hosted in the cloud. Although not shown, the enterprise network 155 may include other network devices such as client computers and storage devices.

When an employee of the enterprise (e.g., the user 195) wishes to access an enterprise resource (e.g., checking his email, running a business application, retrieving a document from a corporate database, etc.), he may be prompted to undergo an authentication procedure using his computer (e.g., the client computer 190) to prove that he is who he purports to be. The authentication procedure may be more or less stringent depending on the enterprise's security requirements. For example, if the user is attempting to access a service provided by a server within the enterprise network 155 (e.g., one of the servers 180A, 180B, . . . ) from a connection point outside the enterprise network 155, he may be prompted to identify himself (e.g., by providing his username) to an enterprise authentication server 160 and provide one or more user credentials (e.g., a password) that can be used by the authentication server 160 to verify his identity. The authentication server may further determine whether the user is authorized to access the requested service, for example, according to one or more enterprise access policies and the user's role within the enterprise's organizational hierarchy.

Additionally, if the user 195 wishes to connect to the enterprise network 155 using the client computer 190, he may be prompted to undergo an endpoint compliance inspection procedure. For example, the user may be prompted to provide a statement of health regarding the client computer 190 to a health policy server (not shown). Based on the statement of health, the health policy server may verify whether one or more protective components are installed on the client computer 190 and, if so, whether they are properly configured and operational. For example, the health policy server may check whether one or more patches have been installed to remedy a vulnerability in an operating system component. As another example, the health policy server may check whether a protective software tool, such as a personal firewall or an anti-virus program, has been installed and configured with appropriate operating parameters.

If the user is attempting to access a service hosted in the cloud, he may be prompted to undergo an authentication procedure with a cloud authentication server 120, which may duplicate some or all of the access control functionalities of the enterprise authentication server 160. For instance, the cloud authentication server 120 may duplicate the enterprise's identity management and access policy infrastructure, so that it can make decisions in the same manner as the enterprise authentication server 160.

SUMMARY

Systems, methods and apparatus are provided for controlling access to resources hosted in a cloud without duplicating an enterprise's identity management and access policy infrastructure to the cloud. In some embodiments, the cloud facility delegates user authentication and/or authorization tasks to a access gateway deployed in a network managed by the enterprise. The access gateway may have access to the enterprise's internal identity management and access policy infrastructure, and may carry out an access control protocol with a user requesting access to a resource hosted in the cloud. The access gateway's access control decisions may be encapsulated in a security token generated by a security token service trusted by an access control component at the cloud facility. The user may submit this token to the access control component in the cloud as evidence that he is authorized to access the requested resource. If the access control component successfully verifies the security token, the user is granted access to the resource.

Various techniques may be employed by the access gateway to authenticate and/or authorize a user. For instance, the access gateway may prompt a user to undergo a multi-factor authentication procedure, by which the user proves his identity to the access gateway based on at least two independent factors. As another example, the access gateway may apply one or more enterprise access control policies to the user's identity and the requested resource to determine whether the user's access request should be granted or denied. As yet another example, the access gateway may prompt the user to submit his computer to a health inspection.

In some embodiments, a method is provided for use by a client computer to access at least one resource hosted by at least one server controlled by at least one service provider. The method comprises: sending, to an access control gateway controlled by at least one enterprise different from the at least one service provider, authentication information associated with a user of the client computer and a statement of health regarding the client computer; receiving a security token from the access control gateway; sending, to the at least one server hosting the at least one resource, the security token received from the access control gateway; and accessing the at least one resource from the at least one server.

In some further embodiments, a client computer is provided for accessing at least one resource hosted by at least one server controlled by at least one service provider. The client computer comprises at least one processor programmed to: send, to an access control gateway controlled by at least one enterprise different from the at least one service provider, access request information purporting to indicate that the client computer is authorized to access the at least one resource; receive a security token from the access control gateway; send, to the at least one server hosting the at least one resource, the security token received from the access control gateway; and access the at least one resource from the at least one server.

In yet some further embodiments, at least one non-transitory computer-readable medium is provided, having encoded thereon instructions that, when executed by at least one processor, perform a method for use by an access gateway controlled by at least one enterprise. The method comprises: receiving, from a client computer, access request information purporting to indicate that the client computer is authorized to access at least one resource hosted by at least one server controlled by at least one service provider different from the at least one enterprise; determining, based at least in part on the access request information, whether the client computer is authorized to access the at least one resource, if it is determined that the client computer is authorized to access the at least one resource, requesting a security token from a security token service trusted by the at least one server; and sending the security token to the client computer to be presented to the at least one server to obtain access to the at least one resource.

The foregoing is a non-limiting summary of the invention, which is defined by the attached claims.

BRIEF DESCRIPTION OF DRAWINGS

The accompanying drawings are not intended to be drawn to scale. For purposes of clarity, not every component may be labeled in every drawing.

DETAILED DESCRIPTION

The inventors have recognized and appreciated a number of disadvantages of existing solutions for controlling access to resources hosted in a cloud. For example, the conventional approach of duplicating the enterprise's identity management and access policy infrastructure in a cloud may be costly, especially for an enterprise having a large number of employees and/or implementing sophisticated access control policies. Additionally, security of the resources may be compromised when the duplicate infrastructure in the cloud becomes out of sync with respect to its counterpart in the enterprise's internal network. For instance, a user with a revoked or expired privilege may be able access resources hosted in the cloud during a window of time before the duplicate infrastructure synchronizes with the internal infrastructure. Therefore, the duplicate identity management and access policy infrastructure may need to be updated frequently to maintain its effectiveness, which may increase the cost for hosting resources in the cloud.

Furthermore, an enterprises may be reluctant to entrust its identity management and access policy infrastructure to a cloud facility, because the compromise of that information may lead to unauthorized access to all enterprise services, even those not hosted in the cloud (e.g., services provided by servers within the enterprise's managed network). Instead, the enterprise may attempt to duplicate to the cloud only a portion of the infrastructure relevant for controlling access to the resources hosted in the cloud. This approach may involve some redesigning of the infrastructure and may again be costly to implement.

In short, the inventors have recognized and appreciated that conventional solutions for controlling access to resources hosted in a cloud may be costly to build and/or maintain, and may fail to provide a satisfactory level of security guarantee. Accordingly, in some disclosed embodiments, systems, methods and apparatus are provided for controlling access to resources hosted in a cloud without duplicating an enterprise's identity management and access policy infrastructure to the cloud.

Figure 1:
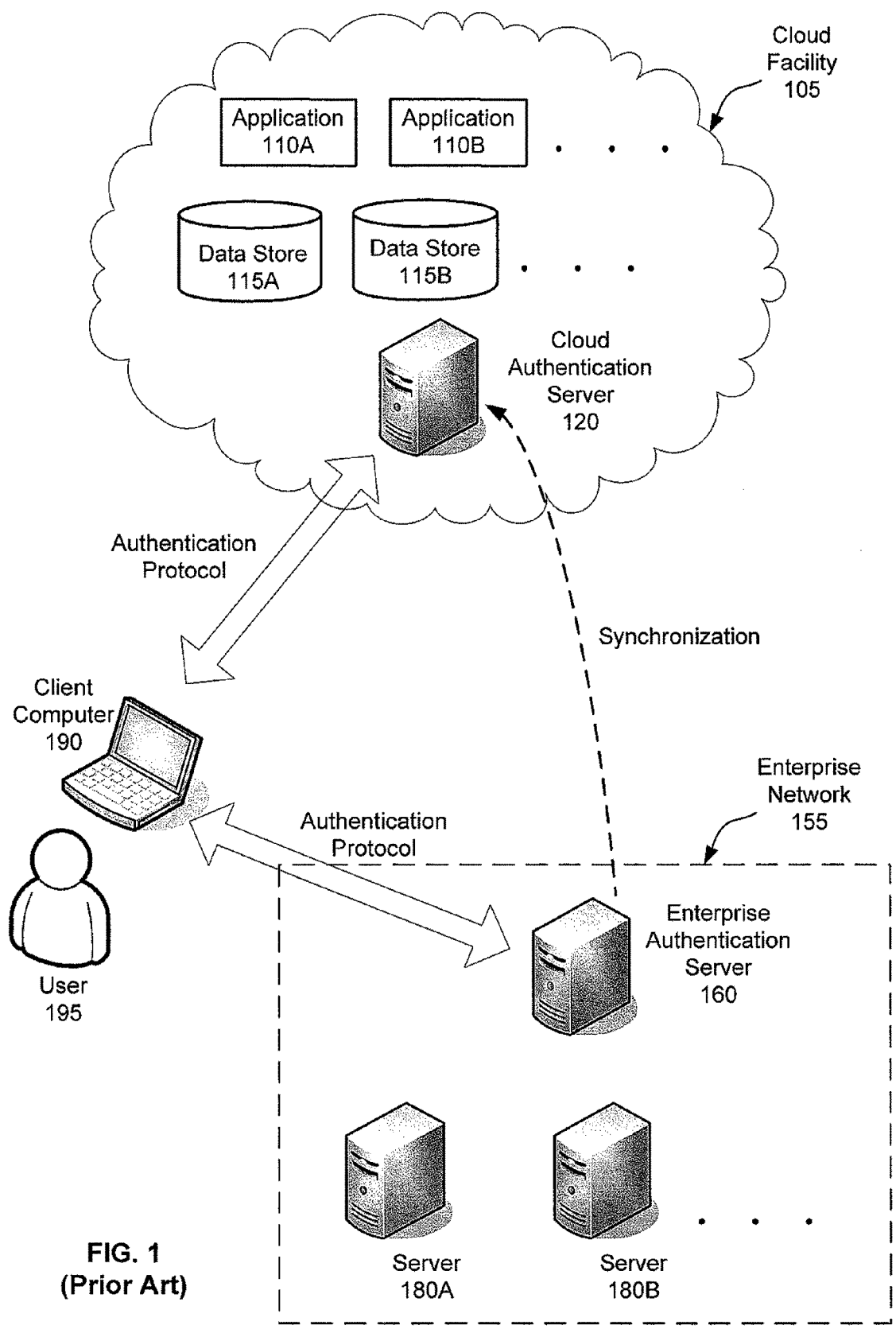
FIG. 1 shows a conventional solution for controlling access to resources hosted in a cloud.

For example, in some embodiments, an access gateway component may be provided to implement some of the access control functionalities conventionally implemented by an authentication server in a cloud (e.g., the cloud authentication server 120 shown in FIG. 1). The access gateway may be deployed in an internal network controlled by the enterprise (e.g., the enterprise network 155 shown in FIG. 1) and may have access to the enterprise's existing identity management and access policy infrastructure (e.g., via an existing authentication server such as the enterprise authentication server 160). Alternatively, the access gateway may be deployed in a demilitarized zone (DMZ), which may also be managed by the enterprise, but may be separated from the internal network by one or more firewalls.

In some embodiments, the access gateway may carry out an access control protocol with a user requesting access to a resource hosted in a cloud, and may communicate the outcome of the protocol to one or more access control components deployed in the cloud, which may ultimately grant or deny access to the requested resource. For example, if the user successfully completes an access request sequence, the access gateway may provide to the user a security token that the user can present to an access control component in the cloud as evidence that the user is authorized to access the requested resource. Prior to granting access, the access control component in the cloud may verify that the security token is generated by a trusted entity, which may be the access gateway itself, or some other entity from which the access gateway obtained the security token. For instance, in some embodiments, the trust relationship between the access control component in the cloud and the entity generating the security token may be implemented according to an Active Directory Federation Services (ADFS) standard (e.g., ADFS v2) or using an SAML protocol.

Various techniques may be employed by the access gateway to authenticate a user. For instance, in some embodiments, the access gateway may prompt a user to undergo a multi-factor authentication procedure, by which the user proves his identity to the access gateway based on at least two independent factors. Examples of factors include, but are not limited to, a piece of secret knowledge (e.g., password, passphrase, or randomly generated secret key), a unique physical object (e.g., passport, credit card, smart card, or hardware token), and some personal physical characteristic of the user (e.g., fingerprint, voice print, facial geometry, iris scan, etc.). The number and types of factors used for authentication may depend on the risks associated with unauthorized access (e.g., as measured by the extent of damages that is likely to result from an instance of unauthorized access).

In addition to authenticating a user, the access gateway may employ various techniques to determine whether the user is authorized to access the requested resource. For instance, in some embodiments, the access gateway may apply one or more enterprise access control policies to the user's identity and the requested resource to determine whether the access request should be granted or denied. For example, the access gateway may check whether the user is a purchaser within the enterprise and thus is authorized to run an Enterprise Resource Planning (ERP) application. As another example, the access gateway may require the user to undergo multi-factor (e.g., 2-factor) authentication before the user is granted access to an application capable of performing bank transfers.

In some further embodiments, the access gateway may prompt the user to submit his computer (e.g., the client computer 195) to a health inspection, as part of an authorization procedure. For example, the computer may have installed thereon one or more health agents programmed to collect configuration and/or operational status information regarding the computer. The collected information may be formatted into a statement of health, which may be transmitted to the access gateway for examination. As a more specific example, the machine health check may be implemented according to the Network Access Protection™ (NAP) framework provided by Microsoft Corporation of Redmond, Wash., U.S.A.

As used herein, the term "enterprise" may refer to any entity having one or more computing resources that may be accessed remotely by users. These computing resources may be hosted on one or more internal servers controlled by the enterprise and/or one or more cloud servers controlled by a cloud computing provider. Examples of enterprises include, but are not limited to, businesses, non-profit organizations, universities, and government entities. Furthermore, a system component (e.g., hardware or software component) is "controlled" by an entity if the entity takes part in operating, maintaining, administering, and/or managing the system component. The entity may or may not own, or have exclusive control over, the system component, and the system component may or may not be physically located on the entity's premises.

The term "security token" (or, simply, "token") may refer to any suitable set of information that may be used for purposes of user authentication and/or authorization. For example, a token may include information identifying the user, his attributes and/or his access permissions. This information may be expressed as one or more Security Assertion Markup Language (SAML) assertions (e.g., in accordance with SAML 2.0). However, other ways of encapsulating the information may also be suitable, as the inventive aspects relating to the content and/or format of security tokens are not limited to the use of any particular language or standard.

Following below are more detailed descriptions of various concepts related to, and embodiments of, inventive systems, methods and apparatus for controlling access to resources hosted in a cloud. It should be appreciated that various concepts introduced above and discussed in greater detail below may be implemented in any of numerous ways, as the disclosed concepts are not limited to any particular manner of implementation. For instance, the present disclosure is not limited to the particular arrangements of components shown in the various figures, as other arrangements may also be suitable. Such examples of specific implementations and applications are provided solely for illustrative purposes.

Figure 2:
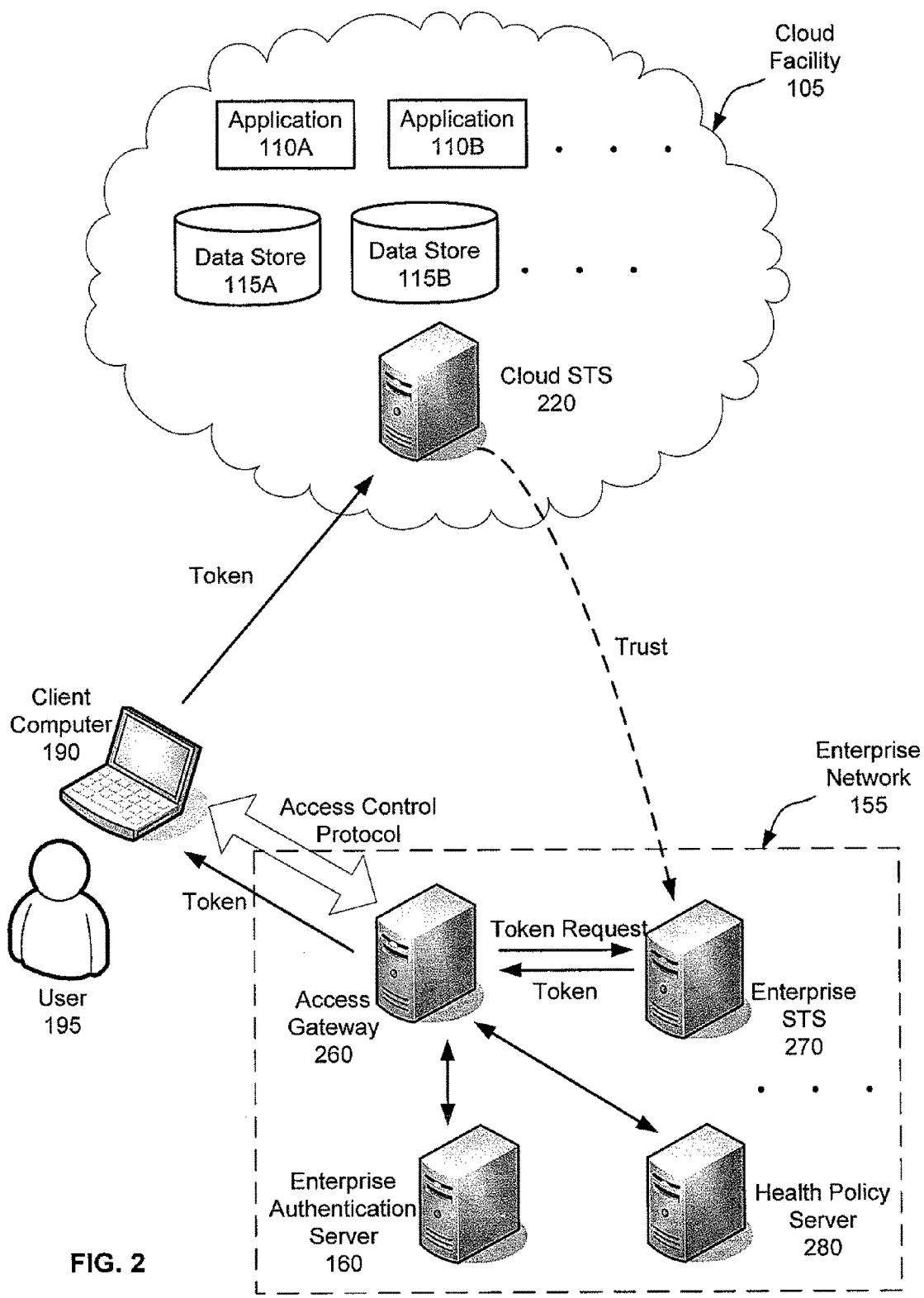
FIG. 2 shows an illustrative system for controlling access to resources hosted in a cloud, in accordance with some embodiments.

FIG. 2 shows an illustrative system for controlling access to resources hosted in a cloud, in accordance with some embodiments of the present disclosure. In this example, an access gateway component 260 is deployed in the enterprise's internal network 155. As discussed above, the access gateway component 260 may, in alternate embodiments, be deployed in a demilitarized zone of the enterprise's managed network, separated from the internal network 155 by one or more firewalls. In either configuration, the access gateway component 260 may be deployed within a network domain controlled by the enterprise and may have access to the enterprise's identity management and access policy infrastructure, either directly (e.g., having direct access to one or more databases storing user identity information and/or access policies) or indirectly via one or more internal servers (e.g., the enterprise authentication server 160 as shown in FIG. 2), depending on the systems topology of the enterprise's managed network. In this manner, the access gateway component may be capable of authenticating a user in the enterprise's security domain and determining whether the user is authorized to access a requested enterprise resource.

In the example illustrated in FIG. 2, the access gateway component 260 has access to an enterprise Security Token Service (STS) 270, which may be any suitable network component configured to issue security tokens (e.g., SAML 2.0 tokens) that are trusted by an access control component at the cloud facility 105, such as the cloud STS 220. Although the enterprise STS 270 and the cloud STS 220 may reside in two different security domains (e.g., domains for the enterprise and the cloud facility, respectively), a cross-domain trust relationship may be established from the cloud STS 220 to the enterprise STS 270 using a suitable federated identity framework (e.g., ADFS v2). This trust relationship allows the cloud facility 105 to delegate user authentication and/or authorization tasks to the access gateway component 260 in the enterprise domain.

For example, rather than performing authentication and/or authorization in the cloud, the same may be performed by the access gateway component 260 in the enterprise network 155, and the results may be encapsulated in a security token generated by the enterprise STS 270. Because the cloud STS 220 trusts the enterprise STS 270, access to resources hosted in the cloud may be granted or denied based on information contained in the security token. For instance, if the security token contains an assertion that a user (e.g., the user 195) is authorized to access a particular resource and the cloud STS 220 verifies that the token was indeed generated by the enterprise 270, the cloud STS 220 may grant the user access to the resource without independently conducting user authentication and/or authorization.

The precise interactions between the user 195, the cloud facility 105 and the access gateway component 260 may be implemented in any suitable manner, as the inventive concepts disclosed herein are not limited to any particular configuration and/or sequence of interactions between the parties. For example, in some embodiments, the user 195 may first contact the cloud facility 105 when he wishes to access a resource hosted on one or more cloud servers (e.g., one of the applications 110A, 110B, . . . , or data stores 115A, 115B, . . . ). Upon receiving the request, a server hosting the requested resource may redirect the user 195 to an STS trusted by the server, such as the cloud STS 220. In some implementations (e.g., in accordance with an SAML architecture), the cloud STS 220 may be the only STS trusted by the server hosting the requested resource, and may have knowledge regarding other trusted STSes to which the user 195 may be further redirected. For instance, the cloud STS 220 may redirect the user 195 to the enterprise STS 270, which is trusted by the cloud STS 220.

It should be appreciated that the user 195 may be redirected any number of times, as long as a trust relationship is preserved each time the user 195 is redirected to a different STS. That is, the user 195 may be redirected by a first STS to a second STS only if the first STS trusts the second STS. Alternatively, the user 195 may not be redirected to any intermediate STS at all. Instead, the server hosting the requested resource may redirect the user 195 immediately to the enterprise STS 270, provided the server trusts the enterprise STS 270.

In the example illustrated in FIG. 2, the enterprise STS 270 is "published" (e.g., made accessible from an external network such as the Internet) by the access gateway component 260. This configuration may allow the access gateway component 260 to intercept any communication directed to the enterprise STS 270. For instance, when the user 195 is redirected to the enterprise STS 270 from the cloud STS 220, the access gateway component 260 may intercept that communication and initiate an access control protocol with the user 195. The access gateway component 260 may request a security token from the enterprise STS 270 only after the user 195 has satisfactorily completed an access request sequence in accordance with the access control protocol, so that the security token may serve as evidence that the user 195 is properly authenticated and/or authorized by the access gateway component 260.

Again, the above described interactions between the user 195, the cloud facility 105 and the access gateway component 260 are merely illustrative, as other sequences and/or types of interactions may also be suitable. For example, in alternate embodiments, the user 195 may contact the access gateway component 260 directly when he wishes to access a resource hosted in the cloud, without being redirected by any component in the cloud.

As discuss above, any number of suitable techniques may be employed by the access gateway component 260 to authenticate and/or authorized the user 195, as the inventive concepts disclosed herein are not limited to any particular access control technique. For example, the access gateway component 260 may request that the user 195 undergo multi-factor authentication, or some other form of strong authentication. The access gateway component 260 may perform some or all of the authentication tasks on its own, if it has access to information needed to complete those tasks. Examples of such information include, but are not limited to, cryptographic keys associated with the user's identity, information relating to the user's personal physical characteristics (e.g., fingerprint, voice print, facial geometry, iris scan, etc.), and/or information relating to a physical object possessed by the user (e.g., magnetic fingerprint of the user's identity card). Alternatively, the access gateway component 260 may forward some of the information received from the user 195 (e.g., user credentials) to the enterprise authentication server 160, which may use the forwarded information to authentic the user 195 on behalf of the access gateway component 260.

Similarly, the access gateway component 260 may perform user authorization on its own, if it has access to relevant information (e.g., access policy information), or it may request that the enterprise authentication server 160 (or some other suitable authorization server) perform user authorization on its behalf. In the latter case, the access gateway component 260 may forward any relevant information to the selected server, such as the user's identity (e.g., as authenticated by the enterprise authentication server 160) and/or information identifying the requested resource (e.g., in the form of a Uniform Resource Locator included in the user's access request).

In some further embodiments, the access gateway component 260 may prompt the user 195 to submit his computer (e.g., the client computer 195) to a health inspection, as part of the authorization procedure. In this context, the "health" of a client computer may refer to the configuration and/or operating status of one or more protective components of the client computer. The protective components may include software and/or hardware components, such as an anti-virus software, firewall, and/or operating system update manager that fetches and installs patches to remedy system vulnerabilities. Configuration information of such a component may include specific parameters of operation that have been set for the component, while operating status of the component may indicate whether the component is operational or disabled.

As discussed above, the client computer 195 may have installed thereon one or more health agents programmed to collect configuration and/or operational status information. The collected information may be formatted into a statement of health, for example, according to the Network Access Protection™ (NAP) framework provided by Microsoft Corporation of Redmond, Wash., U.S.A. The statement of health may be transmitted to the access gateway component 260 for examination. Again, the access gateway component 260 may examine the statement of health on its own, if it has access to machine health policies for the enterprise, or it may forward the statement of health to a health policy server 280 for evaluation.

If the user successfully completes all (or a threshold number) of the access control procedures implemented by the access gateway component 260, the access gateway component 260 may request a security token from the enterprise STS 270 and transmit it to the user 195, who may in turn forward the token to the entity that redirected the user 195 to the enterprise STS 270 (e.g., the cloud STS 220). The cloud STS 220 may verify that the token was generated by the enterprise STS 270 and that the content of the token indicates the user 195 is authorized to access the requested resource. If the verification succeeds, the cloud STS may generate a second security token and transmit it to the user 195, who may then forward the second token to the server hosting the requested resource for verification. If the server successfully verifies the second token, it may grant access of the resource to the user 195. As one skilled in that art can readily appreciate, this process of token generation and verification may be repeated for every intermediate STS through which the user 195 has been redirected.

Although specific details of implementation have been described above in connection with FIG. 2, it should be appreciated that the inventive concepts disclosed herein are not limited to any specific modes of implementation. For example, although the access gateway and the enterprise STS are illustrated in FIG. 2 as two separate components, they may be implemented together as a single component, or in any other suitable configuration. As another example, any of the access control techniques employed by the access gateway component 260 may be implemented by third-party software. For instance, a third-party multi-factor authentication component may be installed on the access gateway component 260 or the authentications server 160 that performs user authentication on behalf of the access gateway component 260.

Figure 3:
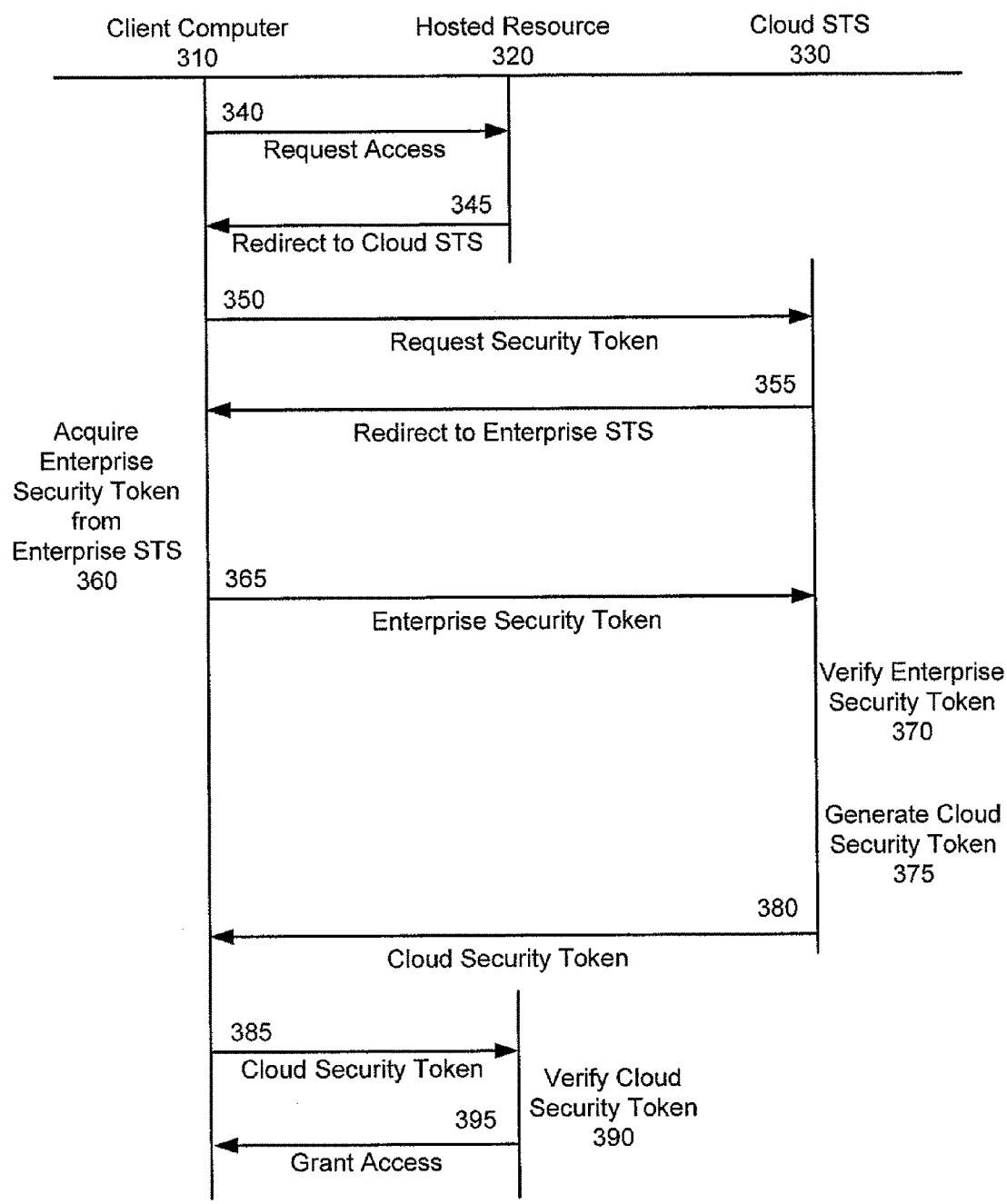
FIG. 3 shows an illustrative sequence of interactions between a client computer, a hosted resource requested by the client computer, and a cloud security token service (STS) trusted by the hosted resource, in accordance with some embodiments.

FIG. 3 shows an illustrative sequence of interactions between a client computer 310, a hosted resource 320 requested by the client computer 310, and a cloud STS 220 trusted by the hosted resource 320, in accordance with some embodiments. The client computer 310 may be the client computer 195 shown in FIG. 2, whereas the hosted resource 320 may be one of the applications 110A, 110B, . . . and data stores 115A, 115B, . . . hosted by the cloud facility 105 shown in FIG. 2. Likewise, the cloud STS 330 may be the cloud STS 220 shown in FIG. 2.

In the example show in FIG. 3, the client computer 310 initiates the interactions at act 340 by sending an access request to the hosted resource 320. The client computer 310 may identify the hosted resource 320 in any suitable manner, such as by using a Universal Resource Locator (URL). In some embodiments, the access request may also identify a user of the client computer 310, for example, by including a user name.

At act 345, the hosted resource 320 responds by redirecting the client computer 310 to obtain a security token from the cloud STS 330, which is trusted by the hosted resource 320. For example, the hosted resource 320 may provide to the client computer 310 a network address and/or any other identifying information for the cloud STS 330. In some embodiments, the hosted resource 320 may further specify a type of security token to be obtained from the cloud STS 330.

As instructed by the hosted resource 320, the client computer 310 submits, at act 350, a request for a security token to the cloud STS 330, which request may identify, in any suitable manner, the hosted resource 320 and/or the user of the client computer 310 wishing to access the hosted resource 320.

At act 355, the cloud STS 330 responds by redirecting the client computer 310 to obtain a security token from an enterprise STS that is trusted by the cloud STS 330 (e.g., the enterprise STS 270 shown in FIG. 2). Similar to act 345, the cloud STS 330 may, in some embodiments, provide to the client computer 310 a network address and/or any other identifying information for the enterprise STS. The cloud STS 330 may further specify a type of security token to be obtained from the enterprise STS.

At act 360, the client computer 310 acquires a security token from the enterprise STS (hereafter the "enterprise security token"), as instructed by the cloud STS 330. As discussed above, the enterprise security token may include one or more SAML 2.0 assertions indicating that the client computer 310 and its user have been properly authenticated and/or authorized to access the hosted resource 320. Furthermore, in some embodiments, the enterprise security token may include one or more electronic signatures generated by the enterprise STS as evidence for the authenticity of the enterprise security token.

Detailed examples of interactions between the client computer 310 and the enterprise STS through which the client computer 310 acquires the enterprise security token is described below in connection with FIG. 4.

Continuing to act 365, the client computer 310 submits the enterprise security token to the cloud STS 330 for verification. At act 370, the cloud STS 330 verifies that the token was generated by an enterprise STS trusted by the cloud STS 330 (e.g., by verifying that an attached signature was generated by the enterprise STS) and that the content of the token indicates the client computer 310 and its user are authorized to access the hosted resource 320. If the verification succeeds, the cloud STS 330 generates, at act 375, a second security token (hereafter the "cloud security token") and transmits it to the client computer 310 at act 380. If the verification fails, the client computer 310 may, in some implementations, be informed of the failure and/or redirected to a different STS to obtain another security token.

At act 385, the client computer 310 forwards the cloud security token to the hosted resource 320 for verification. The hosted resource 320 verifies the cloud security token in a manner similar to the verification carried out at act 390. If the verification succeeds, the hosted resource 320 grants access to the client computer 310 at act 395. If the verification fails, the client computer 310 may be denied access to the hosted resource 320 and may, in some implementations, be redirected to a different STS to obtain another security token.

Figure 4:
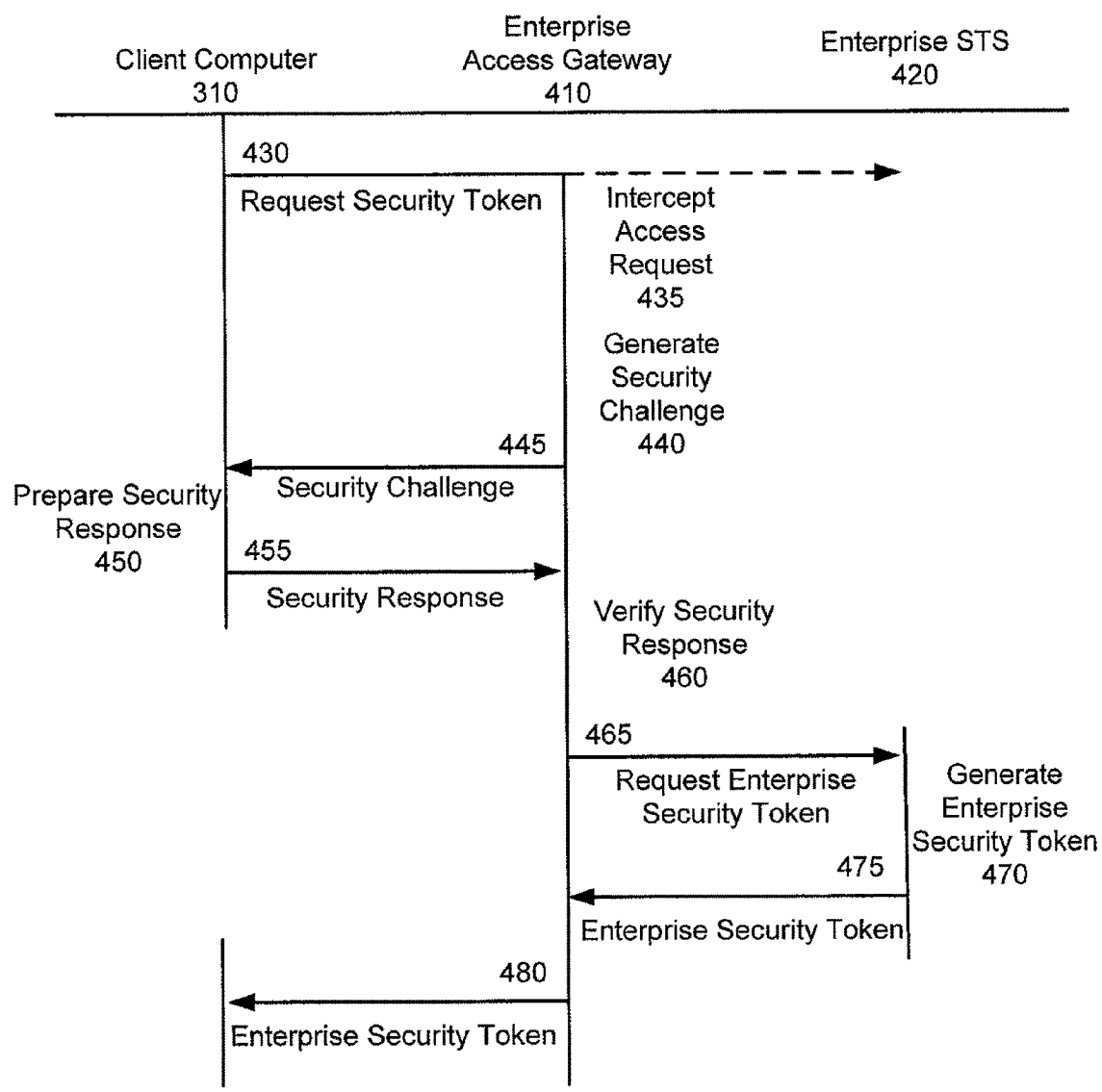
FIG. 4 shows an illustrative sequence of interactions between a client computer, an enterprise STS, and an enterprise access gateway publishing the enterprise STS, in accordance with some embodiments.

Continuing to FIG. 4, an illustrative sequence of interactions is shown between the client computer 310, an enterprise STS 420 (e.g., the enterprise STS 270 shown in FIG. 2), and an enterprise access gateway 410 publishing the enterprise STS 420 (e.g., the access gateway component 260 shown in FIG. 2), in accordance with some embodiments. Through these interactions, the client computer 310 acquires a security token from the enterprise STS 420 indicating that the client computer 310 and its user are authorized to access a resource hosted in a cloud (e.g., the hosted resource 320 shown in FIG. 3).

As discussed above, having the enterprise access gateway 410 publish the enterprise STS 420 may allow the enterprise access gateway 410 to intercept communications directed to the enterprise STS 420. For instance, when the client computer 310 requests a security token from the enterprise STS 420 at act 430, the enterprise access gateway 410 intercepts that communication at act 435 and initiate an access control protocol with the client computer 310 by generating a security challenge at act 440 and transmitting the security challenge to the client computer 310 at act 445. The content of the security challenge may vary depending on the access control techniques employed by the enterprise access gateway 410. For instance, as discussed above, the security challenge may include challenges for multi-factor authentication and/or machine health check.

At act 450, the client computer 310 may collection relevant information and prepare a security response to the challenge received from the enterprise access gateway 410. For example, the client computer 310 may respond to a multi-factor authentication challenge by providing multiple user credentials, as known in the art. An another example, the client computer 310 may use one or more client health agents to collect health information and prepare a statement of health to be included in the security response.

At act 455, the client computer 310 transmits the assembled security response to the enterprise access gateway 410, which verifies each component of the security response at act 460 for user authentication and/or authorization. For instance, the enterprise access gateway 410 may retrieve authentication information associated with the user's purported identity and determine whether the user is really who he purports to be. As another example, the enterprise access gateway 410 may retrieve access policy information and determine whether the user is authorized to access the requested resource. As yet another example, the enterprise access gateway 410 may retrieve machine health policy information and determine whether the client computer 310 is sufficiently healthy (e.g., unlikely to have been infected by a computer virus) to access the requested resource. Alternatively, the enterprise access gateway 410 may request one or more suitable servers (e.g., the authentication server 160 and the health policy server 280) to perform any of the above described verifications.

If the enterprise access gateway 410 determines at act 460 that the client computer 310 and its user are authorized to access the requested resource, it requests a security token from the enterprise STS 420. In response, the enterprise STS 420 generates the requested token at act 470 and transmits it to the enterprise access gateway 410 at act 475. As discussed above, this enterprise security token may indicate that the client computer 310 and its user have successfully passed the access control tests implemented by the enterprise access gateway 410, such as strong authentication and machine health check. At act 480, the enterprise access gateway 410 forwards the enterprise security token to the client computer 310, so that the client computer 310 may present the enterprise security token to an access control component in the cloud (e.g., the cloud STS 330 shown in FIG. 3) to gain access to the desired resource (e.g., the hosted resource 320 shown in FIG. 3).

Figure 5:
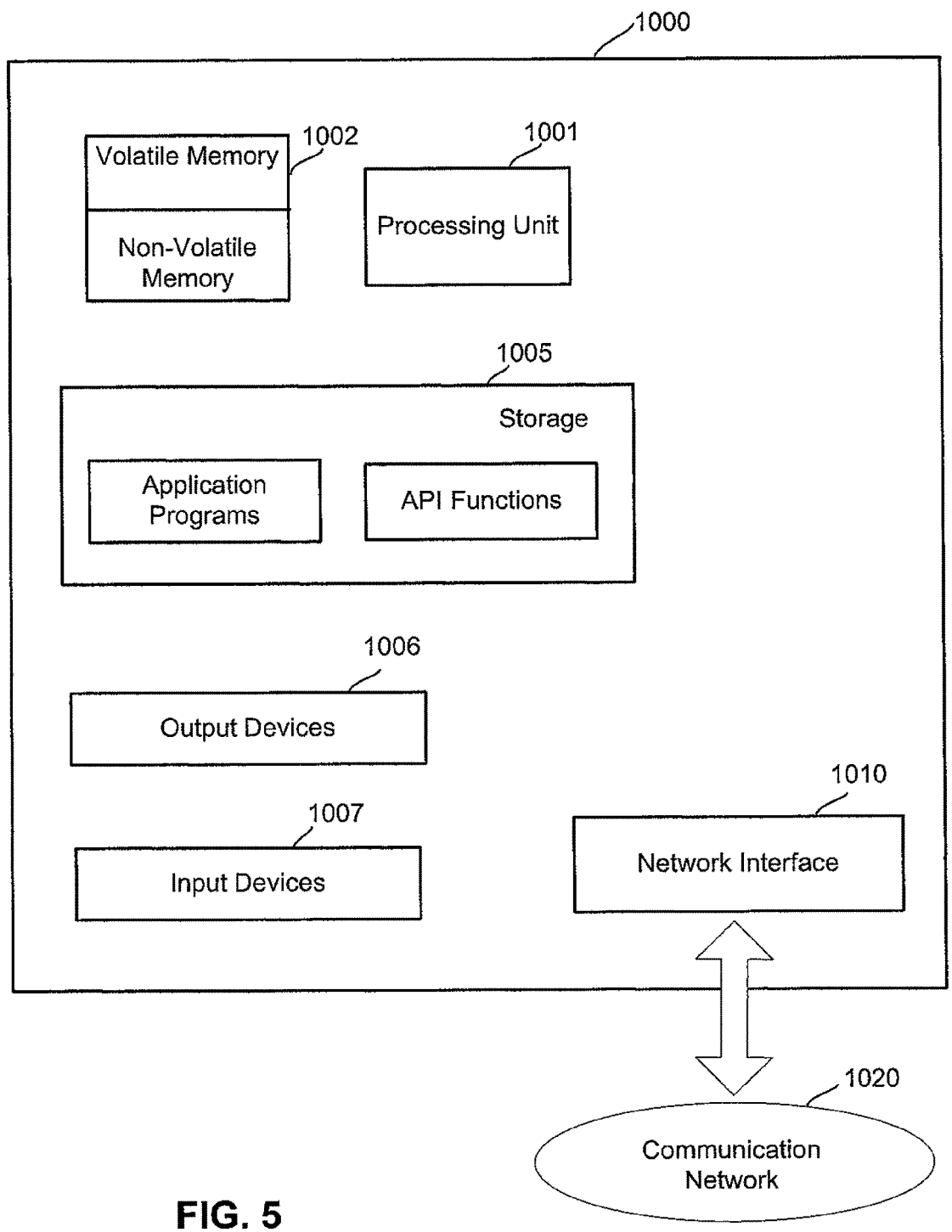
FIG. 5 shows, schematically, an illustrative computer on which various inventive aspects of the present disclosure may be implemented.

FIG. 5 shows, schematically, an illustrative computer 1000 on which various inventive aspects of the present disclosure may be implemented. For example, any of the network components described herein may be implemented on a computer such as the computer 100, including, but not limited to, the client computer 190, the cloud security token service 220, the access gateway 260, the enterprise security token service 270, the authentication server 160, and the health policy server 280, all shown in FIG. 2.

In the example shown in FIG. 5, the computer 1000 includes a processing unit 1001 having one or more processors and a memory 1002 that may include volatile and/or non-volatile memory. The computer 1000 may also include storage 1005 (e.g., one or more disk drives) in addition to the system memory 1002. The memory 1002 may store one or more instructions to program the processing unit 1001 to perform any of the functions described herein. The memory 1002 may also one more application programs and/or Application Programming Interface (API) functions.

The computer 1000 may have one or more input devices and/or output devices, such as devices 1006 and 1007 illustrated in FIG. 5. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

As shown in FIG. 5, the computer 1000 may also comprise one or more network interfaces (e.g., the network interface 1010) to enable communication via various networks (e.g., the network 1020). Examples of networks include a local area network or a wide area network, such as an enterprise network or the Internet. Such networks may be based on any suitable technology and may operate according to any suitable protocol and may include wireless networks, wired networks or fiber optic networks.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other non-transitory, tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any mariner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for use by a client computer to access at least one resource hosted by at least one server controlled by at least one service provider, comprising:
    sending, from the client computer, to an access control gateway controlled by at least one enterprise different from the at least one service provider, authentication information associated with a user of the client computer and a statement of health regarding the client computer;
    sending a request for the security token to the access control gateway;
    receiving at least one security challenge from the access control gateway, wherein the access control gateway sends the at least one security challenge in response to the request for the security token, and wherein the client computer sends the authorization information and the statement of health in response to the at least one security challenge;
    receiving, at the client computer, a security token from the access control gateway prior to attempting to access the at least one server hosting the at least one resource;
    sending, by the client computer, to the at least one server hosting the at least one resource, the security token received from the access control gateway; and
    accessing the at least one resource from the at least one server without further authentication processes.

2. The method of claim 1, further comprising:
    sending, to the at least one server, a request to access the at least one resource; and
    receiving, from the at least one server, an instruction to contact the access control gateway as a prerequisite to accessing the at least one resource.

3. The method of claim 1, wherein the authentication information comprises at least two user credentials selected from a group consisting of: a secret knowledge credential, a physical object credential, and a personal physical characteristic credential.

4. The method of claim 1, wherein the statement of health regarding the client computer comprises configuration information regarding at least one protective component of the client computer, the at least one protective component being selected from a group consisting of: an anti-virus software, a firewall, and an operating system patch.

5. The method of claim 1, wherein the access control gateway is configured to determine, based at least in part on the access request information, whether the client computer is authorized to access the at least one resource hosted by the at least one server, and wherein the security token is obtained from a security token service by the access control gateway if the access control gateway determines that the client computer is authorized to access the at least one resource, the security token service being trusted by the at least one server.

6. A client computer for accessing at least one resource hosted by at least one server controlled by at least one service provider, comprising at least one processor programmed to:
    send, from the client computer to an access control gateway controlled by at least one enterprise different from the at least one service provider, access request information purporting to indicate that the client computer is authorized to access the at least one resource;
    send a request for the security token to the access control gateway; receive at least one security challenge from the access control gateway, wherein the access control gateway sends the at least one security challenge in response to the request for the security token, and wherein the at least one processor is programmed to send the access request information in response to the at least one security challenge;
    receive a security token from the access control gateway at the client computer prior to attempting to access the at least one server hosting the at least one resource;
    send, from the client computer, to the at least one server hosting the at least one resource, the security token received from the access control gateway;
    access the at least one resource from the at least one server; and
    wherein the client computer includes at least one hardware processor.

7. The client computer of claim 6, wherein the at least one processor is further programmed to:
    send, to the at least one server, a request to access the at least one resource; and
    receive, from the at least one server, an instruction to contact the access control gateway as a prerequisite to accessing the at least one resource.

8. The client computer of claim 6, wherein the access request information comprises at least two user credentials selected from a group consisting of: a secret knowledge credential, a physical object credential, and a personal physical characteristic credential.

9. The client computer of claim 6, wherein the access request information comprises configuration information regarding at least one protective component of the client computer, the at least one protective component being selected from a group consisting of: an anti-virus software, a firewall, and an operating system patch.

10. The client computer of claim 6, wherein the access control gateway is configured to determine, based at least in part on the access request information, whether the client computer is authorized to access the at least one resource hosted by the at least one server, and wherein the security token is obtained from a security token service by the access control gateway if the access control gateway determines that the client computer is authorized to access the at least one resource, the security token service being trusted by the at least one server.

11. The client computer of claim 10, wherein the at least one server is configured to determine whether the security token is generated by a trusted security token service, and wherein the at least one server allows the client computer to access the at least one resource only if the at least one server determines that the security token is generated by a trusted security token service.

12. At least one non-transitory computer-readable medium having encoded thereon instructions that, when executed by at least one processor, perform a method for use by an access gateway controlled by at least one enterprise, the method comprising:

receiving, from a client computer, access request information purporting to indicate that the client computer is authorized to access at least one resource hosted by at least one server controlled by at least one service provider different from the at least one enterprise prior to the client computer attempting to access the at least one resource;

receiving a request for the security token from the client computer; in response to the request for the security token, sending at least one security challenge to the client computer, wherein the client computer sends the access request information in response to the at least one security challenge;

determining, based at least in part on the access request information, whether the client computer is authorized to access the at least one resource by forwarding at least some of the access request information comprising configuration information regarding the client computer to a health policy server controlled by the least one enterprise; and if it is determined that the client computer is authorized to access the at least one resource, sending a security token to the client computer to be presented to the at least one server to obtain access to the at least one resource.

13. The at least one non-transitory computer-readable medium of claim 12, wherein the method further comprises:
requesting the security token from a security token service trusted by the at least one server.

14. The at least one non-transitory computer-readable medium of claim 12, wherein the access request information comprises at least two user credentials selected from a group consisting of: a secret knowledge credential, a physical object credential, and a personal physical characteristic credential.

15. The at least one non-transitory computer-readable medium of claim 12, wherein determining whether the client computer is authorized to access the at least one resource comprises:
forwarding at least some of the access request information comprising one or more user credentials to an authentication server controlled by the least one enterprise.

16. The at least one non-transitory computer-readable medium of claim 12, wherein the access request information comprises configuration information regarding at least one protective component of the client computer, the at least one protective component being selected from a group consisting of: an anti-virus software, a firewall, and an operating system patch.

* * * * *